US005079720A

United States Patent [19]

Sinclair

[11] Patent Number: 5,079,720

[45] Date of Patent: Jan. 7, 1992

[54] DISPLAY SYSTEM FOR REPRESENTING AN ARRAY OF DATA VALUES IN A DISPLAY FIELD

[75] Inventor: David A. Sinclair, Eastleigh, England

[73] Assignee: International Business Machines Corporation, Armonk, N.Y.

[21] Appl. No.: 310,808

[22] Filed: Feb. 14, 1989

[30] Foreign Application Priority Data

Aug. 23, 1988 [GB] United Kingdom .................. 8820013

[51] Int. Cl.$^{5}$ .................. G06F 15/62

[52] U.S. Cl. .................. 395/143; 364/487

[58] Field of Search .................. 364/518, 521, 487; 340/812

[56] References Cited

U.S. PATENT DOCUMENTS

| | | | |
|---|---|---|---|
| 3,576,948 | 5/1971 | Stauffer | 346/146 |
| 4,143,365 | 3/1979 | Cayzac et al. | 340/347 SH |
| 4,509,530 | 4/1985 | Curtis et al. | 128/710 |
| 4,713,771 | 12/1987 | Crop | 364/487 |
| 4,755,960 | 7/1988 | Batson et al. | 364/715.02 |

FOREIGN PATENT DOCUMENTS 2659336 7/1977 Fed. Rep. of Germany .

*Primary Examiner*—Heather R. Herndon
*Assistant Examiner*—Mark K. Zimmerman
*Attorney, Agent, or Firm*—William A. Kinnaman, Jr.; George E. Clark

[57] ABSTRACT

In a display system an array of data values such as, for example, an array of speech waveform samples, is represented in a display field by logically dividing the display field into a number of display areas and determining (e.g. in 16), for each value of the data array, the area of the display field within which that value should be displayed, comparing that value to a range for the area in question and updating the range to include that value if it lies outside the range previously defined for that area and then plotting, within each area of the display field, a line joining display screen positions defined by the range in the range storage for that area.

15 Claims, 4 Drawing Sheets

DISPLAY SYSTEM FOR REPRESENTING AN ARRAY OF DATA VALUES IN A DISPLAY FIELD

FIELD OF THE INVENTION

The invention relates to information handling systems, and more particularly to display systems for representing arrays of data values in a display field.

BACKGROUND OF THE INVENTION

The display field of a display system may take the form of the screen of a device such as a cathode ray tube or a liquid crystal display, or possibly also the print field of a printer. The data for display may be stored by the display device itself as would be the case in a storage tube, or it may be held in refresh storage for, for example, a cathode ray tube device. Either way, a mechanism has to be provided in order to specify the actual location within the display field at which a particular piece of information is to be displayed. In digital systems, this is done by dividing the display field into an array of pixel positions which can be addressed. This means that the display field is quantized and raises problems in the case where an array of data values to be represented is large and consequently has a finer definition than is provided by the quantization of the display field.

One example where difficulties arise in the display of data within a display field is in the display of speech waveforms. Typically, 1 second of speech would comprise 10000 samples whereas graphic displays can at best display around 1000 pixels in the x or y direction. To display a significant portion of the speech waveform with x as the time axis, therefore, many consecutive waveform samples will have to be associated with a single x pixel position. The conventional approach to plotting the samples in the display field is to plot each of the sample values in turn in accordance with a scaling factor whereby many sample values are plotted at each pixel position along the x axis.

SUMMARY OF THE INVENTION

The object of the invention is to improve the plotting performance of a display system for representing large arrays of data values in a display field.

In accordance with a first aspect of the invention a display system is provided including means for representing an array of data values in a display field, range storage for each of a number of display areas within the display field, ranging logic for determining, for each value of the data array, the area of the display field within which that value should be displayed, for comparing that value to the range defined by the range storage for the area in question and for updating the range defined by the range storage to include that value if it lies outside the range previously defined by the range storage and plotting logic for plotting, within each said area of the display field, a line joining display screen positions defined by the range in the range storage for that area.

In accordance with a second aspect of the invention a method is provided of representing an array of data values within a display field including the steps of logically dividing the display field into a plurality of display areas and associating range storage with each display area, determining, for each value of the data array, the area of the display field within which that value should be displayed, comparing that value to the range defined by the range storage for the area in question and updating the range defined by the range storage to include that value if it lies outside the range previously defined by the range storage and plotting, within each said area of the display field, a line joining display screen positions defined by the range in the range storage for that area.

The invention recognizes that the overplotting in the display field which was performed in prior art display systems was inefficient and time consuming due to the time taken to write data into the display field (e.g. plotting values in a display buffer) and provides for the preprocessing of data values in the data array to reduce the number of plots made in the display field. Although the advantages of the invention are particularly apparent in the case of large arrays of data values, the invention is not limited to the processing of large arrays only.

In a particular embodiment of the invention to be described later, the range storage for a display area comprises a maximum and a minimum register. After the ranging logic has processed the data values of the data array, the maximum and minimum registers for a display area will contain the maximum and minimum values, respectively, of the range for that area.

In the particular embodiment to be described later, the display system additionally comprises secondary plotting logic for determining whether a maximum value in the range for a display area is lower than a minimum value in an adjacent display area and, in the case where the determination is positive, for plotting an additional line joining display screen positions defined by said maximum and minimum values for those area. This secondary plotting logic enhances the representation of the array of data values in the case where the number of samples per display areas is not very high (e.g. 1 to 5 samples per display area).

The display system may additionally comprise initialization logic for setting the range storage to an invalid range and the ranging logic be arranged to he responsive to an invalid range when comparing a value to the range defined by the range storage for a display area to replace the invalid range with said value. An invalid range could be represented, for example, by storing maximum and minimum values in the range storage where the value for the minimum is larger than the value for the maximum.

The initial storage of an invalid range is not essential, however, and the initialization logic may merely comprise means for presetting the range storage to a predetermined value, (e.g. the expected median value for a speech waveform). This latter approach is adopted in the particular embodiment to be described later.

In the particular embodiment to be described later where the array of data values to be represented is a one-dimensional array, each display area is a strip within the display field. In this embodiment, the display field comprises an array of pixel positions and each strip is one pixel position wide.

A display system as defined above, can form part of a waveform analyzer. In this case, the array of data values to be displayed on a display screen is a one dimensional array comprising samples of a waveform to be analyzed. In such a waveform analyzer the array of data values is usually in the form of a data stream and the display system is adapted to process the data stream serially.

BRIEF DESCRIPTION OF THE DRAWING

In the following a waveform analyzer comprising a display system in accordance with the present invention is described with reference to the accompanying drawings in which.

DETAILED DESCRIPTION OF EMBODIMENTS OF THE INVENTION

Figure 1:
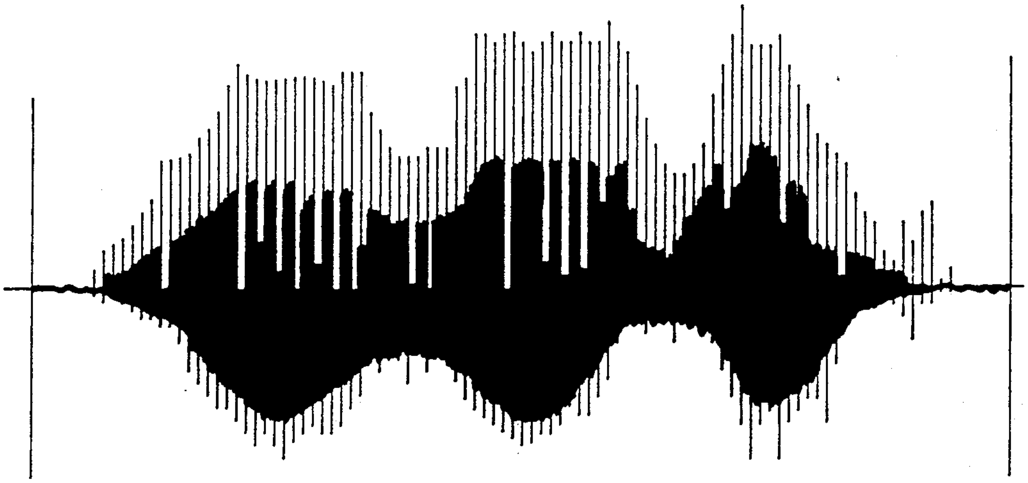
FIG. 1 is a schematic illustration of a speech waveform.

FIG. 1 is a schematic illustration of a speech waveform 10 as seen on a display screen 12 of a display system. The speech waveform represented here is to the expression "We are away" said in 1.06 seconds. Typically the speech is sampled at a rate of 10,000 samples per second, which means that the waveform shown comprises 10,600 samples. In a conventional display system, in order to display the waveform in graphical form, successive samples are displayed along the horizontal direction with the sample values themselves allocated to the y coordinates and a line drawn between each (x,y) point and its neighbor. However most graphic displays can at best display around 1000 pixels in the x and y direction—and this means that for the long waveforms being considered here a suitable scaling factor must be applied to the x axis. Thus many consecutive waveform samples will be associated with a single x pixel position and consequently many of the lines on the plot will be drawn in positions where a line has already been drawn.

In the following, a system is described which enables a large number of points to be displayed within a display field such as a display screen with a limited number of pixel positions without the inefficiency of overplotting.

Figure 2:
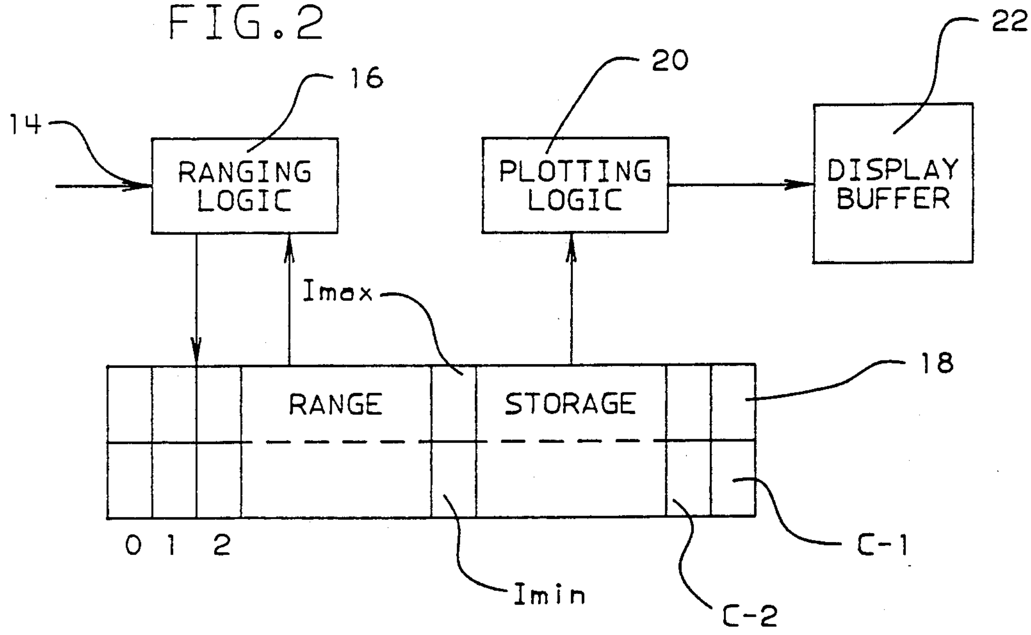
FIG. 2 is a schematic block diagram of a preferred embodiment of the present invention.

FIG. 2 gives an overview of part of a display system in accordance with the invention. The display system in turn forms part of a speech analyzer (not shown) which provides a stream of speech samples at an input 14 to ranging logic 16. The speech samples are supplied to the input 14 of the ranging logic 16 in chronological order.

The ranging logic 16 is operative to determine for each sample, an area of a display field within which that value should be displayed. In the present example, it is assumed that the display field corresponds to the visible part of the display screen. However, it could alternatively relate to a virtual screen or presentation space for a window for display, or to the area of a buffer for printing or facsimile transmission, and the like.

The present display system is adapted to display a speech waveform which is represented by a one dimensional data array (i.e. a string of data values) in the form of the data stream on a pixel based display screen with time plotted along the x axis. To this end, the display field is logically divided into display areas in the form of vertical strips, each of one pixel width. Thus, if there are L samples to be displayed within the display field and C pixels (0, 1, 2, 3, . . . ,I, . . . , C-2, C-1) in the X direction, there will be L/C samples associated with each pixel position (i.e. with each display area).

Range storage 18 comprises storage (e.g. Imax, Imin) for an indication of a range of values for each area (e.g. the Ith area) of the display field. As shown in FIG. 2, a pair of storage locations (e.g. Imax, Imin) is provided for each vertical row of pixels for storing a maximum and a minimum value, respectively, for that vertical row of pixels.

The ranging logic is also operative, having determined an area of a display field (e.g. the Ith area) within which that value should be displayed, to compare the value of that sample to the range of values defined by the range storage (e.g. Imax, Imin) for the area in question. The ranging logic updates the range defined by the range storage for that area to include the value of the sample if it lies outside the range previously defined for the area. Thus, after processing each of the samples for an area in this way, the maximum and minimum sample values for the area are to be found in the appropriate maximum and minimum storage location.

Figure 3:
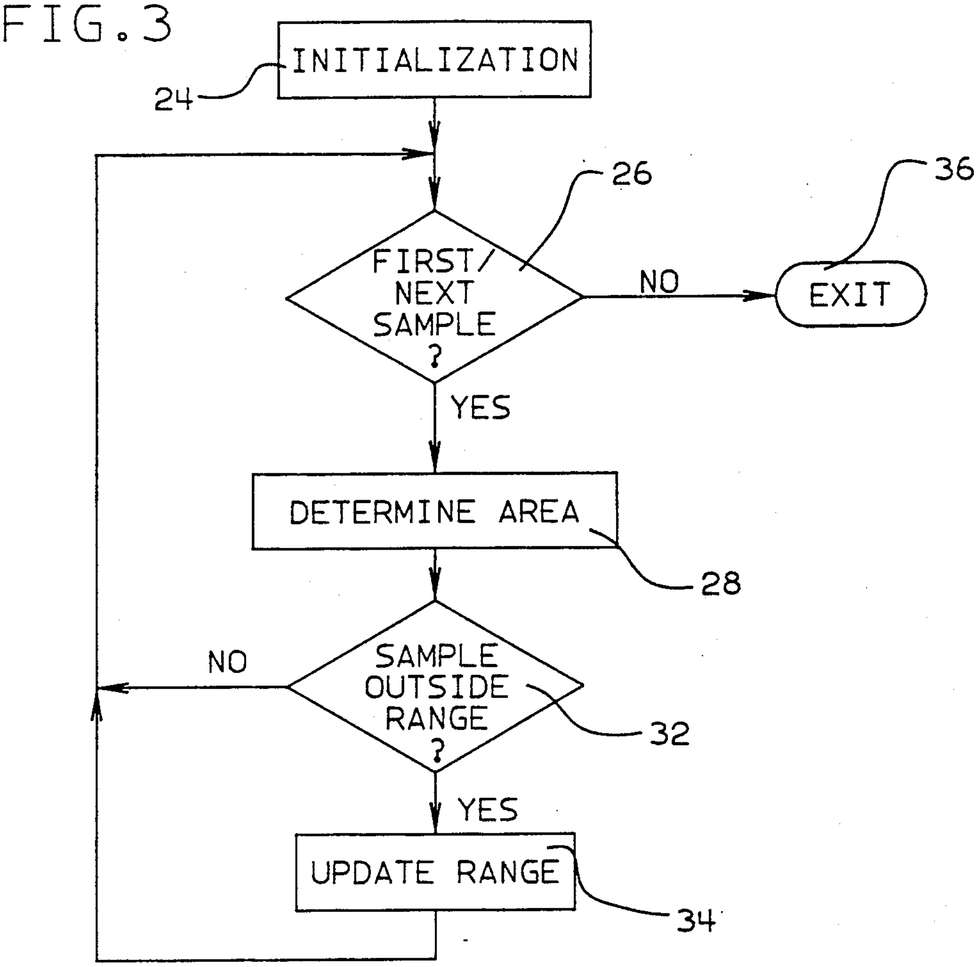
FIG. 3 is a schematic flow diagram illustrating the operations of part of the logic of FIG. 2.

The operation of the ranging logic of an embodiment of the invention for plotting a speech waveform is illustrated in FIG. 3.

Before processing the stream of waveform samples, the ranging logic resets the range storage and certain variables (as will be explained later) in step 24. Then, after determining in step 26 that the first sample has been received, the plotting logic determines, in step 28, the display area within which the sample should be displayed. This can be done in any convenient and appropriate manner. As the samples are received sequentially, the display area can be determined simply by the following equation:

$$\text{No. of display area} = (L/C) * \text{sample number}$$

where L number of samples; and C number of display areas.

This assumes that L/C is an integer. However, in general, this will not be the case. Consequently, it is preferred that the following technique is employed to determine the display area to which a sample belongs. In order to explain the technique, let us first define the following variables, namely:

m = number of speech waveform points less 1 = L-1
N = number of display areas less 1 = C-1
b = number of current display area, in the range O . . . N
p = number of the current point, in the range O . . . m
e = a running error, the purpose of which is explained in the following.

It should be noted that the values b, p and e are set to zero in step 24 before processing the string of speech samples.

In step 28, therefore, on processing each sample, the value N is added to the existing error value, e, and the new e value is tested to determine whether it is greater than m/2. If the new error value, e, is less than or equal to m/2, this means that the current sample is associated with the current display area. If, however, the error value, e, is greater than m/2 this indicates that all the samples for the display area, b, have been processed, and consequently, the number of the current display area, b, is incremented. In this case the error value, e, is also adjusted to take account of the change of the display area number by subtracting the value m from the current error value, e.

The technique is analogous to the Bresenham line drawing algorithm and has the effect of evenly distributing the samples within the various area of the display field when L/C is not an integer. It also has the advantage that it requires no time consuming multiple operations, and can therefore be implemented efficiently in assembly language.

Once the display area within which the sample is to be displayed has been determined, a test is made in step 32 to determine whether the sample lies within the sample range corresponding to this display area already stored in the range storage. The sample storage can take the form of a table comprising a maximum and minimum register for each of the display areas. The registers may be special purpose registers or may be implemented by suitably configuring general purpose storage. The selection of the registers for a display area can be made using the display area number, b, as an element of an address for the registers (e.g. as an index from a base address for the first register in the range storage).

If the new sample value lies outside the range defined by the maximum and minimum values stored in the registers, the appropriate register, or registers can be updated, in step 34, by replacing the previous value stored in the register with the new sample value. If the new sample value lies within the range stored in the range register, then the new sample value is discarded and the range is not updated.

In the present embodiment, it should be noted that the range values for each display area (i.e. both the maximum and minimum values) were initially set in step 24 to the expected median value for the speech samples (i.e. to the mid value $y=0$). This is a simple approach which works well in the case of speech waveforms, as it can reasonably be assumed that there will be at least one sample value to be plotted above and below the y axis for each display area. However, an alternative approach would be initially to set the range values to an invalid range (e.g. with the minimum value larger than the maximum value), and to test for this in step 32 when comparing a new sample value to the values stored for range. If then, an invalid range is found, this means that the sample being processed is the first sample for that display area and the new sample value is to be stored in both the maximum and minimum registers for the current display area.

If, on returning to step 26, there is a further sample to be processed, then the steps 28 to 34 are repeated for the next sample. Otherwise, the processing by the ranging logic is complete, at 36.

In addition to the ranging logic, plotting logic 20 is provided for accessing range storage 18 for plotting a line within each display area between display field positions corresponding to the maximum and minimum values indicated by the appropriate locations in the range storage.

Figure 4:
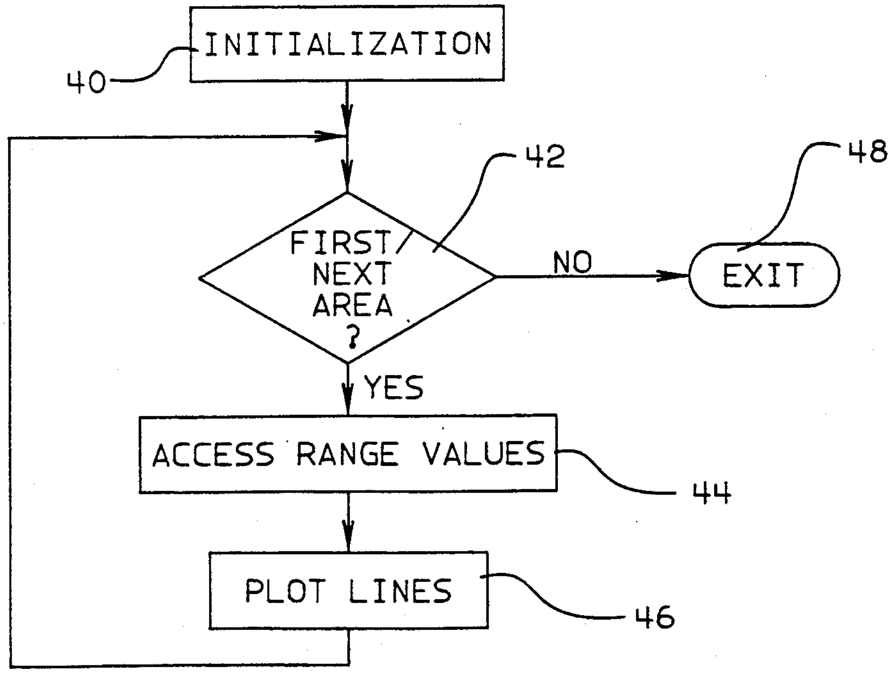
FIG. 4 is a schematic flow diagram illustrating the operation of a second part of the logic of FIG. 2.

The operation of the plotting logic is illustrated in FIG. 4. The plotting logic is initialized at step 40 with a pointer to the range registers for the first area. The plotting logic then accesses the pair of storage locations for the first area at step 44 and plots, at step 46, a line between the display positions represented by the range values stored in those registers. In the present embodiment the step 46 of plotting a line comprises writing appropriate values into locations in the display buffer 22 for causing a line t be displayed at the position in the X direction which extends between the maximum and minimum Y positions indicated by the values in the maximum and minimum storage locations for that X position. If, on returning to step 42, there is a further display area to be processed, then the steps 44 and 46 are repeated for the further display area. If not, then the plotting logic completes its operation at step 48.

If an invalid range is set in the range logic for each of the display areas by the ranging logic before processing the samples, as described above, and an appropriate test is made in step 46 above, then the existence of an invalid range can be used by the plotting logic to determine that no data needs to be plotted for a given display area.

It will be noted that the plotting of the lines is performed in the present embodiment after all of the samples have been processed by the ranging logic. However, it should be noted that a line could be drawn for a display area as soon as all the samples which map onto that area have been processed.

By preprocessing the data to be displayed in the above manner, unnecessary overplotting of lines on the display (i.e. the repeated overwriting of information in the display buffer which is a relatively time-consuming process) is avoided. This results in a much faster display speed. An estimate of the improvement can be made as follows. Suppose the average time taken to draw a line (i.e. to plot a line in the display buffer) is T1. Using the conventional approach to displaying a waveform, L lines will be drawn. When using the approach employed in the invention however, only C lines will be drawn, independent of the number of samples in the plot. There will, however, be the overhead of computing each range, so say this takes a time T2 per display area. The ratio of the time taken to draw the waveform using the conventional overplotting technique to the time taken to produce the plot using ranging is then $$C \cdot \frac{L \cdot T1}{(T1 + T2)}$$

Hence, if $T2 << T1$, as $L \rightarrow$ infinity the improvement becomes L/C. So for one second of speech, sampled at 10 KHz, displayed on an IBM 3279 screen (with $C=800$), L/C is given by $10000/800=12$. In this case, however, T2 is significant compared to T1 so that a factor of 3 improvement in performance was realized.

The above technique works well when L/C is much greater than 1. However, when there are only a few speech samples (e.g. between 0 and 5 for a speech waveform sampled at 10 MHz) in each display area the plot can have the appearance of a graph made up of dotted lines rather than solid ones. This is because, with fewer samples per area, each area is likely to have a shorter line, so that the liens in adjacent areas may not overlap. In order to approve the appearance of the plot in such a case, the plotting logic can be modified as illustrated in FIG. 5.

Figure 5:
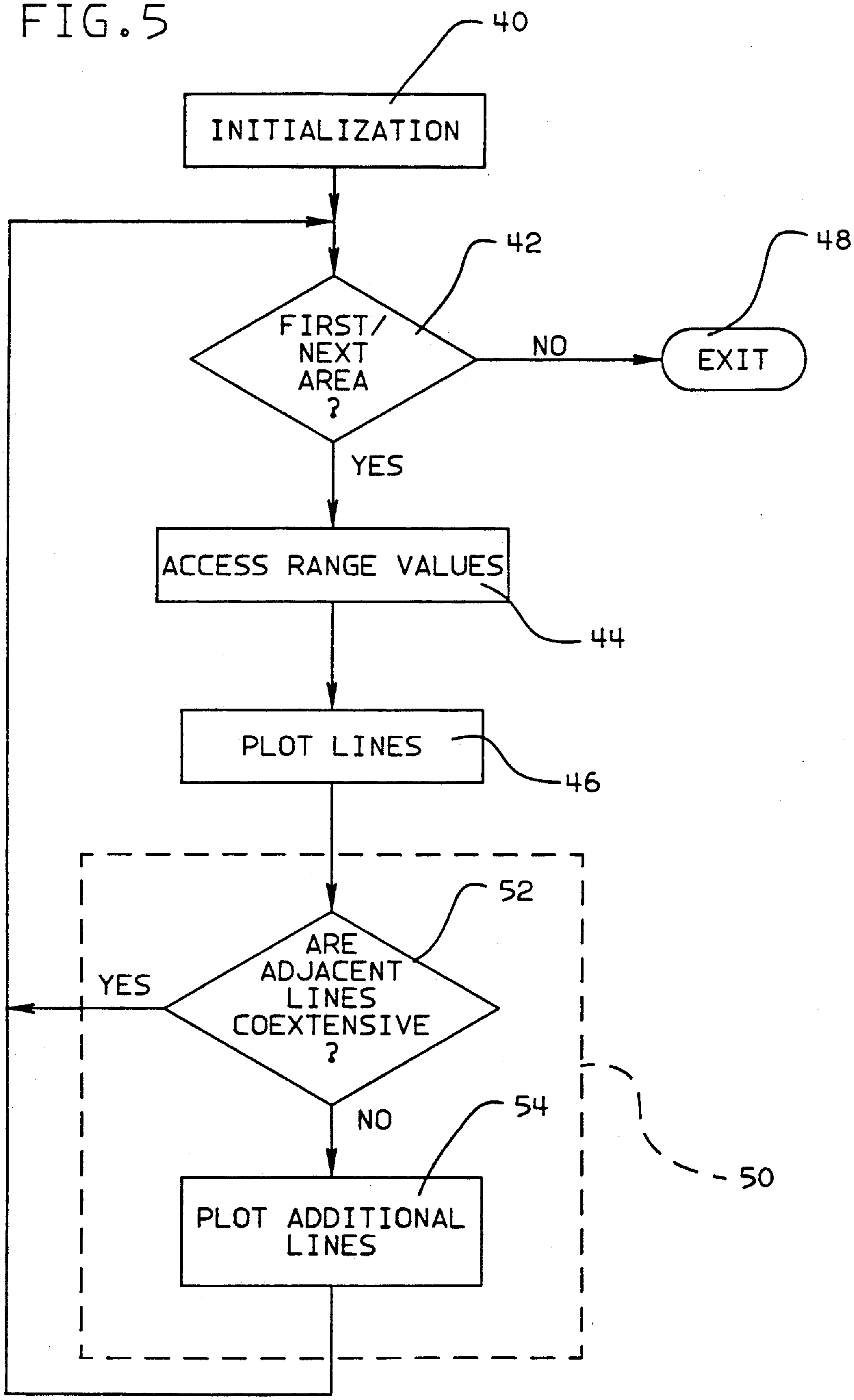
FIG. 5 is a schematic flow diagram illustrating the operation of a modified form of the logic of FIG. 4.

The plotting logic of FIG. 5 is essentially the same as the logic of FIG. 4, but includes additional logic 50. At step 52 the plotting logic determines whether a line previously plotted in a display area adjacent to the current display area is at least partially co-extensive with a line just plotted in the current display area. If the lines are not at least in part co-extensive then an additional line is plotted at step 54 to join up the lines of the adjacent areas in the following manner.

If the minimum of the previously plotted line is higher than the maximum of the line just plotted, then an additional line is plotted to join up the points at the minimum of the previously plotted line and the maximum of the line just plotted. Similarly, if the maximum of the previously plotted line is lower than the minimum of the line just plotted, then an additional line is plotted to join up the points at the maximum of the previously plotted line and the minimum of the line just plotted.

While the further logic increases the numbers of lines plotted, it can enhance the representation of the array of data if the array is scarcely populated. In order to make most of the trade-off between the plotting time and the display quality, the additional logic 50 is preferably enabled when the ratio of L/C is less than T where T is a certain threshold value. In order to do this, the logic of step 24 preferably includes means for comparing the ratio of L/C to the threshold value T and for enabling, or otherwise, the additional logic in dependence of the result of the comparison.

The selection of the threshold value, T, depends in each individual case on the nature of the signal being displayed. The selection criterion is that T should be sufficiently large that, in any T samples, there will be at least one local minimum and one local maximum of the waveform. For a typical speech sampling rate of 10 KHz this gives a value of T=10 samples per display area. If the speech sampling rate is increased, then the value of T should be scaled in proportion.

The invention provides for fast, efficient plotting, particularly, but not exclusively, suitable for displaying long waveforms on displays with relatively limited x resolution. The advantages of the invention are that the number of line sections actually plotted is minimized and overplotting is prevented. This saves time and ensures that the displayed waveform is correctly matched to the resolution of the output device.

Figure 6:
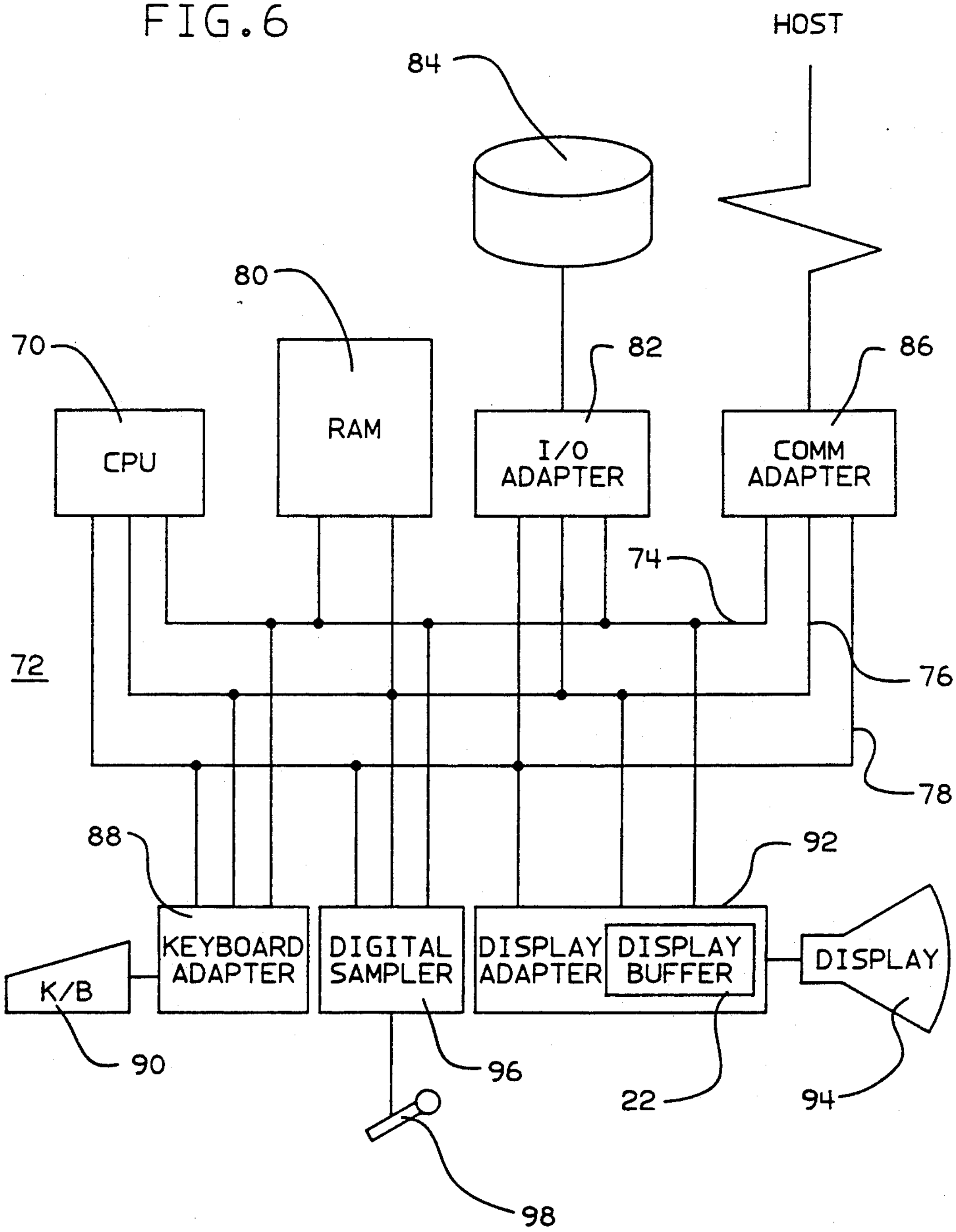
FIG. 6 is a schematic block diagram of a computer system for incorporating the embodiment of FIG. 2.

FIG. 6 is a schematic block diagram of a personal computer on which the present invention may be implemented. The personal computer comprises a number of different system units connected via a system bus 72. The system bus comprises a data bus 74, an address bus 76 and a control bus 78. Connected to the system bus is a microprocessor 70, random access memory 80, a keyboard adapter is used to connect a keyboard 90 to the system bus. The display adapter includes a display buffer 22 for storing information defining a screen of data for display and connected the system bus to a display device 94 such as a cathode ray tube (CRT) device. The I/O adapter likewise provides a connection between other input/output devices 84 (e.g. DASDs) and the system bus. The personal computer may also be provided, as is shown, with a communications adapter 86 for allowing the personal computer to be connected to and to communicate with an external processor or processors such as a host processor (not shown).

A display system in accordance with the invention can be implemented on the personal computer by suitably programming. The logic described above can be provided by appropriate programming code and the range storage registers can be provided by suitably configuring the system memory (RAM 80).

If the personal computer is used to implement a display system in accordance with the invention, then the hardware illustrated above will normally suffice. This is also the case if the personal computer is used to analyze waveforms which have already been sampled and digitized. The personal computer can, however, be configured as a waveform analyzer and additionally comprise a microphone 98 and digital sampler 96 for sampling the speech directly.

The present invention is not, however, limited to such an implementation and may be implemented as a special purpose processor or as a special purpose adapter for use with a general purpose computer.

In such as case, one or more of the storage elements mentioned could be provided by units of discrete storage. Similarly, the logic may well be provided wholly or in part by special purpose logic.

Although a particular embodiment of the invention has been described above, it will be appreciated that the invention is not limited thereto and that many modifications and additions are possible within the scope of the present invention as defined in the attached claims.

For example, although the invention has been particularly described with reference to the use of a visual display device such as a cathode ray tube, the invention also covers the use of other forms of display devices such as, for example, a pen plotter. In the case of a pen plotter for example, not only is time saved due to overplotting being avoided but also pen wear is reduced.

Also, although the invention is particularly described with reference to the display of a data array in the form of a speech waveform, the invention is also applicable to, and is intended to cover, the display of other arrays of data.

What is claimed is:

1. A method of representing an array of data values within a display field comprising the steps of:

(a) logically dividing the display field into a plurality of display areas and associating range storage with each display area for defining a range for that area;

(b) for each value of the data array, (1) determining the display area within which that value should be displayed, said determining step including the steps of incrementing an error value by a predetermined value that is a function of the total number of values in the data array, comparing the incremented error value with a threshold value, and determining said display area in accordance with the result of said comparison, (2) comparing that value to the range defined by the range storage for the area in question, and (3) updating the range defined by the range storage to include that value if the value lies outside the range previously defined by the range storage; and (c) plotting, for each said area of the display field, a line joining display screen positions defined by the range in the range storage for that area.

2. A method as claimed in claim 1 in which said line is plotted at appropriate locations in a display buffer.

3. A display system comprising means for representing an array of data values in a display field, said means comprising:

(a) range storage for defining a range for each of a plurality of display areas within the display field, (b) ranging logic for determining, for each value of the data array, the display area within which that value should be displayed, for comparing that value to the range defined by the range storage for the area in question and for updating the range defined by the range storage to include that value if the value lies outside the range previously defined by the range storage;

(c) primary plotting logic for plotting, for each said area of the display field, a line joining display screen positions defined by the range in the range storage for that area;

(d) secondary plotting logic for determining whether a maximum value in the range for a first display area is lower than a minimum value in an adjacent display area and, in the case where the determination is positive, for plotting an additional line joining display screen positions defined by said maximum value for said first area and said minimum value for said adjacent area; and (e) means for comparing the ratio of data values to display areas with a predetermined threshold value and for enabling said secondary plotting logic in accordance with the result of said comparison.

4. A display system as claimed in claim 3 wherein the range storage for a display area comprises a maximum and a minimum register.

5. A display system as claimed in claim 3 additionally comprising initialization logic for setting the range storage to an invalid range wherein the ranging logic is responsive to an invalid range when comparing a value to the range defined by the range storage for a display area to replace the invalid range with said value.

6. A display system as claimed in claim 3 additionally comprising initialization logic for setting the range storage to an invalid range wherein the ranging logic is responsive to an invalid range when comparing a value to the range defined by the range storage for a display area to replace the invalid range with said value.

7. A display system as claimed in claim 3 additionally comprising initialization logic for setting the range storage to an invalid range wherein the ranging logic is responsive to an invalid range when comparing a value to the range defined by the range storage for a display area to replace the invalid range with said value.

8. A display system as claimed in claim 3 additionally comprising initialization logic for presetting the range storage to a predetermined value.

9. A display system as claimed in claim 3 additionally comprising initialization logic for presetting the range storage to a predetermined value.

10. A display system as claimed in claim 3 wherein each display area is a strip within the display field.

11. A display system as claimed in claim 10 wherein the display field comprises an array of pixel positions and wherein each strip is one pixel position wide.

12. A display system as claimed in claim 3 wherein the display field comprises an array of pixel positions.

13. A waveform analyzer comprising a display system as claimed in claim 3 wherein the array of data values to be displayed on a display screen represents a waveform to be analyzed.

14. A waveform analyzer as claimed in claim 13 wherein the array of data values is in the form of a data stream and wherein the display system is adapted to process the data stream serially.

15. A display system as claimed in claim 3 additionally comprising a display buffer for storing the data to be displayed, said plotting logic plotting said line at appropriate locations in the display buffer.

* * * * *